US007280976B2

(12) United States Patent
Litwiller et al.

(10) Patent No.: US 7,280,976 B2
(45) Date of Patent: Oct. 9, 2007

(54) METHOD FOR GENERATING A RATING FOR ASSESSING ACCESSIBILITY STANDARDS COMPLIANCE

(75) Inventors: Debora Margaret Heiza Litwiller, Rochester, NY (US); Cornell W. Juliano, Churchville, NY (US); Richard A. Schieck, Rochester, NY (US); Heidi M. Grenek, Fairport, NY (US); Bridgette E. Rivers, Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 1085 days.

(21) Appl. No.: 10/109,802

(22) Filed: Mar. 28, 2002

(65) Prior Publication Data

US 2003/0187724 A1 Oct. 2, 2003

(51) Int. Cl.
*G06F 11/34* (2006.01)
(52) U.S. Cl. ...................... 705/11; 705/1; 705/8; 705/9
(58) Field of Classification Search ............... 705/1, 705/8, 9, 11
See application file for complete search history.

(56) References Cited

U.S. PATENT DOCUMENTS

| 5,086,393 | A | * | 2/1992 | Kerr et al. ................... 702/186 |
| 5,724,262 | A | * | 3/1998 | Ghahramani ................ 702/186 |
| 5,726,884 | A | * | 3/1998 | Sturgeon et al. ................ 705/9 |
| 6,029,144 | A | * | 2/2000 | Barrett et al. .................. 705/30 |
| 6,047,261 | A | * | 4/2000 | Siefert ......................... 705/11 |
| 7,113,914 | B1 | * | 9/2006 | Spielmann et al. ............. 705/7 |
| 2004/0148568 | A1 | * | 7/2004 | Springer ..................... 715/513 |

FOREIGN PATENT DOCUMENTS

WO   WO 9859307 A1 * 12/1998

OTHER PUBLICATIONS

Nielsen, J. and Mack, R. 1994. Usability Inspection Methods. New York: John Wiley & Sons, Inc. pp. 3-41.*
National Institute of Standards and Technology. Common Industry Format for Usability Test Reports Version 1.1 (1999).*
Shneiderman, B. Designing the User Interface, 3rd ed. Addison-Wesley, Reading, MA (1998).*
Section 508: Scope Back*Updated*: Jun. 21, 2001.
Guide to the Section 508 Standards for Electronic and Information Technology • Scope (1194.1-1194.5).
The *Software Applications* standards of Rule 1194.21 of Section 508.
*Web-Bases Applications* standards of Rule 1194.22.
Standards relating to *Telecommunications Products* as outlined in Rule 1194.23.
Standards relating to *Video Products* of Rule 1194.24.
Standards relating to *Self-contained Products* of Rule 1194.25.
Standards relating to *Computers* of Rule 1194.26.
Standards applicable to *Functionality Requirements* of Rule 1194. 31.
Standards relating to *Product Support and Documentation* of Rule 1194.41.
CD ROM—Entitled"Accessibility Standards for Electronic and Information Technology under Section 508 of the Rehabilitation Act Amendments of 1998".

* cited by examiner

*Primary Examiner*—Romain Jeanty
(74) *Attorney, Agent, or Firm*—Fay Sharpe LLP

(57) ABSTRACT

A method for generating a compliance rating for federally mandated accessibility standards for a consumer oriented product is disclosed wherein relevance criteria for at least one provision of said standards has already been defined. The method involves the steps of identifying at least one configuration for the product to rate, determining which rules of the standard are relevant to the identified configuration and generating a list of user functions for the configuration, dividing each of the user task functions intended to be performed into a plurality of sub-tasks, filtering the generated list of tasks as to appropriateness and applicability, and performing each sub-task and rating the performance against the identified relevant standards as defined therein. Lastly, the method involves repeating these steps until all configurations of the product under review have been rated.

20 Claims, No Drawings

METHOD FOR GENERATING A RATING FOR ASSESSING ACCESSIBILITY STANDARDS COMPLIANCE

FIELD OF THE INVENTION

This invention relates generally to the field of methods which generate one or more rating values for assessing compliance with federal standards and, more particularly, to those methods which generate a rating value for determining compliance with Federal Accessibility Standards for Electronic and Information Technology.

BACKGROUND OF THE INVENTION

In June 2001, Section 508 of the US Rehabilitation Act went into effect requiring all electronic information technology (EIT) equipment purchased by the US Federal Government to comply with a series of specifications intended to improve the operability for people with disabilities. The law states, in part, that if no fully compliant product is available, the government must purchase the product which is the most compliant with the law's specifications. The government does not describe or suggest any process by which compliance may be measured.

What is needed in the art is a method which generates a set of metrics which describe criteria for meeting each of section 508's specifications and for determining a rating depending on whether a particular product meets, fails to meet, or does not apply as against each of said section's specifications.

SUMMARY OF THE INVENTION

What is disclosed is a method for generating a compliance rating for federally mandated accessibility standards for a consumer oriented product wherein relevance criteria for at least one provision of said standards has already been defined. The method involves the steps of first identifying at least one configuration for the product to rate. Then, determining which rules of the standard are relevant to the identified configuration and generating a list of user functions for the configuration that a customer would be expected to perform in the normal operation of the product. Dividing each of the user task functions intended to be performed into a plurality of sub-tasks. Filtering the generated list of tasks as to appropriateness and applicability wherein appropriateness is defined as those tasks required to be reported on. For each sub-task, performing the task and rating the performance against the identified relevant standards as defined therein as to whether the task can be performed in accordance with the associated relevant rule. Lastly, the method involves repeating these steps until all configurations of the product under review have been rated.

Other salient features of the invention will become apparent from the detailed description which disclose the preferred embodiments of the invention.

DETAILED DESCRIPTION OF THE INVENTION

What is disclosed is a method for generating a compliance rating for federally mandated accessibility standards for a consumer oriented product wherein relevance criteria for at least one provision of said standards has already been defined.

The method involves the steps of first identifying at least one configuration for the product to rate. A configuration preferably should be representative of the product offering(s) to which the intended buyer or procurer has an interest. This takes into account everything which may be bundled with the product including functionality, drivers, DFE, help, support, among others. Generally, anything which has been designed and/or manufactured for sale with the end-product should be included into the configuration identification step.

The next step involves determining which rules of the standard are relevant to the identified configuration. With regard to Section 508, there are eight rules for which relevancy to the product under assessment must be determined. These are:

Rule 1194.21—Software Applications
Rule 1194.22—Web-Based Applications
Rule 1194.23—Telecommunications Products
Rule 1194.24—Video Products
Rule 1194.25—Self-contained Products
Rule 1194.26—Computers
Rule 1194.31—Functionality Requirements
Rule 1194.41—Product Support and Documentation By way of example the step of determining which rules of the standard as the method of the present invention applies to Section 508 are relevant to the identified configuration would preferably proceed as follows: The Software Applications standards of Rule 1194.21 of Section 508 would be deemed relevant if the product under assessment includes software running on a computer device. Web-Bases Applications standards of Rule 1194.22 would be deemed relevant if the product under assessment contains or creates one or more web pages. Standards relating to Telecommunications Products as outlined in Rule 1194.23 would be deemed relevant if the product transmits voice information. Standards relating to Video Products of Rule 1194.24 would be deemed relevant if the product receives and/or displays a video broadcast. Standards relating to Self-contained Products of Rule 1194.25 would be deemed relevant if the product includes hardware other than a computer. Standards relating to Computers of Rule 1194.26 would be relevant to the product under assessment if the product includes a laptop or desktop computer. Standards applicable to Functionality Requirements of Rule 1194.31 would be relevant if the product requires user/customer interaction. Lastly, standards relating to Product Support and Documentation of Rule 1194.41 would be relevant if the product includes user documentation and/or support services which the customer/user would need or use.

Regarding the step of determining which user functions are relevant to operation and maintenance of the product under assessment, a function would be relevant if the customer/user would routinely be expected to perform the function on the product as sold, delivered, and supported. This preferably involves, for each relevant function, identifying whether the function is a primary function or a secondary function. A primary function is one which can be normally expected to be performed at least once per day by the customers, whereas a secondary function is one which can be normally expected to be performed less than on a once-per-day basis. These are generally considered to be product dependent. One time tasks which the customer would be expected to have completed during product installation and configuration are preferably assessed separately from primary and secondary functions. For example, typical user functions of a copier machine would be: program and run jobs, load documents, load paper trays, unload copies and prints from the output tray, clear jams in the machine, use programming and other advanced features, and load supplies such as toner and paper appropriately into the machine as needed.

The next step of the method of the present invention is to divide each of the user functions intended to be performed into a plurality of sub-tasks in order to facilitate the assessment process and to ensure that minor tasks are not overlooked or skipped in the assessment process. Generally, sub-tasks are defined as those actions which should be completed as part of any one particular previously identified user function. For example, the previously identified user function of program and run jobs would be divided into the sub-tasks of: powering up, selecting basic features, inserting or accessing a job to be copied, starting that job, running the job, and retrieving the completed output. The user function of load documents would be divided into the sub-tasks of: accessing paper tray doors, unlocking paper trays, opening the trays, adjusting the tray for the correct paper width and height, inserting the appropriate paper, closing the tray, and locking the tray in place.

The next step in the method of the present invention involves filtering the generated list of user performed functions as to appropriateness and applicability to the standard to which the product under review is being assessed. Appropriateness hereunder is preferably defined as those tasks required to be reported on by a given statute and applicability generally means whether one or more of the rules for the standard applies to any particular task to be performed. If a rule is not relevant to a particular task, then a rating of Not-Applicable (NA) would preferably be applied as to all of that rule's specifications as applied to that task. For example, if a product's software is not used by the operation when adjusting a paper tray side guide, then NA would be recorded for the task for each of rule under 1194.21. Furthermore, if desired or necessary, a percentage can be alternatively recorded where parts of the product under assessment meet the specification (YES) and where other parts do not (NO). For instance, if there are twenty jam clearance areas on a product under assessment and twelve of them meet a particular specification, then a percentage rating of 12/20 or 60% would then be recorded for that particular test.

For each sub-task, the method of the present invention involves performing the identified task and rating the performance against the identified relevant standards as defined therein as to whether the task can be performed in accordance with the associated relevant rule. The steps are repeated until all user tasks have been applied to the relevant associated standard and rated. When all inspections are complete, a tabulation is preferably performed once for the identified primary functions, once for the identified secondary functions, and then once for all functions combined. In the instance wherein a "Y" for (YES) was given to those functions which met or exceeded the associated standard and a "N" for (NO) was applied to those which failed to meet the associated standard, then a total score can be generated by: $Y_{total}/(Y_{total}-N_{total})$. Optionally, other mathematical formulas could be used as a final tabulation mechanism.

In summary, what is disclosed herein is a method for generating a compliance rating for federally mandated accessibility standards for a consumer oriented product wherein relevance criteria for at least one provision of said standards has already been defined. The method involves the steps of first identifying at least one configuration for the product to rate. Then, determining which rules of the standard are relevant to the identified configuration and generating a list of user functions for the configuration that a customer would be expected to perform in the normal operation of the product. Dividing each of the user task functions intended to be performed into a plurality of sub-tasks. Filtering the generated list of tasks as to appropriateness and applicability wherein appropriateness is defined as those tasks required to be reported on. For each sub-task, performing the task and rating the performance against the identified relevant standards as defined therein as to whether the task can be performed in accordance with the associated relevant rule. Lastly, the method involves repeating these steps until all configurations of the product under review have been rated.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. For a product under review, a method for generating a compliance rating for federally mandated accessibility standards for said product, wherein relevance criteria for at least one provision of said standards has already been defined, comprising the steps of:

a) identifying at least one configuration for said product to rate;

b) determining which rules of said standard are relevant to said identified configuration;

c) generating a list of user operation or maintenance tasks for said configuration that a customer would be expected to perform in the normal operation of said product;

d) dividing each of said user functions intended to be performed into a plurality of sub-tasks;

e) filtering said generated list of tasks as to appropriateness and applicability of said standards, wherein appropriateness is defined as those tasks required to be reported on;

f) for each sub-task, performing said task and rating said performance against the identified relevant standards as defined therein as to whether said task can be performed in accordance with the associated relevant rules;

g) for each relevant standard, assigning a "Y" value to the rating when the standard is met by the sub-task, and assigning an "N" value to the rating when the standard is not met by the sub-task, wherein the rating is recorded as a percentage instead of a "Y" value or an "N" value when a portion of the of the assessed configuration meets the standard and a portion does not;

h) calculating a total compliance rating score for the configuration via a formula, wherein the formula includes an algorithm: $Y_{total}/(Y_{total}-N_{total})$, where $Y_{total}$ is the sum of all "Y" ratings for the configuration, and $N_{total}$ is the sum of all "N" ratings for the configuration; and i) repeating steps A—H until all configurations of said product under review have been rated.

2. The method for rating a product as set forth in claim 1, wherein at least one configuration includes one or more of a driver, a digital front end, support, help, and a functionality associated with the product.

3. The method for rating a product as set forth in claim 1, wherein the standards used are described by one or more government regulations.

4. The method for rating a product as set forth in claim 1, wherein the operation and maintenance tasks are further identified as one of a primary function and a secondary function.

5. The method for rating a product as set forth in claim 4, wherein the primary function is one that is performed once or more per day, and the secondary function is one which is performed less than once per day.

6. The method for rating a product as set forth in claim 1, wherein the product is a copier machine.

7. The method for rating a product as set forth in claim 6, wherein the user functions of the copier machine include one or more of: programming a job, running a job, loading a document, loading a paper tray, unloading a copy or a print from an output tray, clearing a jam in the machine, and loading a supply into the machine.

8. The method for rating a product as set forth in claim 1, wherein the sub-task is an action which is completed as part of any one particular previously identified user defined function.

9. The method for rating a product as set forth in claim 1, wherein an "NA" value is assigned to the rating when a rule or specification does not apply to a given task.

10. A system for determining a compliance rating for federally mandated accessibility standards for a consumer product, comprising:
   an identification component that identifies at least one configuration of the product to be rated, and generates a list of user performed functions for that configuration;
   a device that determines a set of rules, from the standard, that are relevant to the identified configuration;
   a filtering element that divides the user performed functions into a plurality of sub-tasks, wherein said sub-tasks relate to appropriateness and applicability of the standard;
   an evaluation component that evaluates the performance of each sub-task against the identified standard, and assigns a "Y" value to the tasks which meet the standard, a "N" value to tasks which do not meet the standard, and a fraction or percentage to tasks which partially meet the standard;
   a summing element that performs a tabulation once for the total number of "Y" and "N" values assigned to one or more primary functions, once for the total number of "Y" and "N" values assigned to one or more secondary functions, and once for the total number of "Y" and "N" values assigned to all functions; and
   a rating component that calculates a total compliance rating score for the configuration via a formula, wherein the formula includes an algorithm: $Y_{total}/(Y_{total}-N_{total})$, where $Y_{total}$ is the sum of all "Y" ratings for the configuration, and $N_{total}$ is the sum of all "N" ratings for the configuration.

11. The system for determining a compliance rating as set forth in claim 10, wherein the standards are divided into categories, including at least one of: a Software Application, a Web-Based Application, a Telecommunications Product, a Video Product, a Self Contained Product, a Computer, a Functionality Requirement and a Product Support and Documentation Standard.

12. The system for determining a compliance rating as set forth in claim 11, wherein the Software Application standard is used if the product under assessment includes software running on a computer device.

13. The system for determining a compliance rating as set forth in claim 11, wherein the Web-Based Application standard is used if the product under assessment contains or creates one or more web pages.

14. The system for determining a compliance rating as set forth in claim 11, wherein the Telecommunications Product standard is used if the product under assessment transmits voice information.

15. The system for determining a compliance rating as set forth in claim 11, wherein the Video Product standard is used if the product under assessment transmits voice information.

16. The system for determining a compliance rating as set forth in claim 11, wherein the Self-contained Product standard is used if the product under assessment includes hardware other than a computer.

17. The system for determining a compliance rating as set forth in claim 11, wherein the Computer standard is used if the product under assessment includes a laptop or desktop computer.

18. The system for determining a compliance rating as set forth in claim 11, wherein the Functionality Requirement standard is used if the product under assessment requires user/customer interaction.

19. The system for determining a compliance rating as set forth in claim 11, wherein the Product Support and Documentation standard is used if the product under assessment includes user documentation and/or support services which the customer/user would need or use.

20. A means for rating a product's compliance with federal accessibility standards, comprising:
   a) means for identifying at least one configuration of said product;
   b) means for determining which rules of said standard are relevant to the configuration;
   c) means for generating a list of user operation or maintenance tasks for said configuration that a customer would perform during normal operation d) means for filtering said generated list of tasks as to appropriateness and applicability of said standards;
   e) means for dividing each of said user functions intended to be performed into a plurality of sub-tasks;
   f) means for rating said sub-tasks by performing each task and rating the performance against the identified relevant standards, wherein a "Y" value is assigned to the rating when tasks meet the standard, and a "N" value is assigned to the rating when tasks do not meet the standard, and a percentage is assigned to the rating when parts of the task meet the standard and parts do not;
   g) means for calculating a total compliance rating score for the configuration via a formula, wherein the formula includes an algorithm: $Y_{total}/(Y_{total}-N_{total})$, where $Y_{total}$ is the sum of all "Y" ratings for the configuration, and $N_{total}$ is the sum of all "N" ratings for the configuration; and
   h) means for repeating steps A—G until all configurations of said product under review have been rated.

* * * * *